United States Patent [19]

Teeter et al.

[11] 3,715,312

[45] Feb. 6, 1973

[54] PRODUCT

[75] Inventors: Ford C. Teeter, Palos Heights, Ill.;
David B. Sheldahl, Griffith, Ind.;
Carle W. Highberg, Newark, N.J.

[73] Assignees: Atlantic Richfield Company, New York, N.Y.; Super Cut Inc., Chicago, Ill.

[22] Filed: Aug. 26, 1970

[21] Appl. No.: 67,291

Related U.S. Application Data

[60] Continuation-in-part of Ser. No. 798,472, Aug. 16, 1968, abandoned, which is a division of Ser. No. 480,492, Aug. 17, 1965, Pat. No. 3,453,784.

[52] U.S. Cl. ................................................. 252/49.5
[51] Int. Cl. ........................... C10m 3/20, C10m 3/02
[58] Field of Search........................... 252/49.3, 49.5

[56] References Cited

UNITED STATES PATENTS

| | | | |
|---|---|---|---|
| 2,968,621 | 1/1961 | Teeter et al. | 252/49.5 |
| 2,447,475 | 8/1948 | Kaberg et al. | 71/111 |
| 2,470,913 | 5/1949 | Bjorksten et al. | 252/33 |

OTHER PUBLICATIONS

Kirk–Othmer "Encycl. of Chem. Technol." 2nd Ed. (1963) pages 37; 38; 39 (Vol. 1).
Houghton "Grinding Wheels & Machines" (1963) pages 305–309 (Pub. by Spon Ltd., London).

*Primary Examiner*—Daniel E. Wyman
*Assistant Examiner*—W. Cannon
*Attorney*—John W. Behringer, Eugene L. Bernard, Martin J. Brown, James S. Dresser, W. Brown Morton, Jr., John T. Roberts, Malcolm L. Sutherland, Morton, Bernard, Brown, Roberts & Sutherland and Thomas J. Clough

[57] ABSTRACT

Emulsifiable compositions are obtained consisting essentially of defined amounts of a long chain fatty acid partial ester of hexitol anhydride, a polyoxyethylene derivative of hexital anhydride partial long chain fatty acid ester, an alkylaryl polyether alcohol having a short polyether chain, and normally liquid oil of lubricating viscosity. These emulsifiable compositions can also contain minor amounts of lard oil and a light petroleum fraction, such as kerosene. A small amount of the emulsifiable composition, such as about 1 to 4 weight percent, is dispersed in water and forms a stable emulsion which is useful as a lubricant in grinding of glass with a diamond grinding surface. These new compositions are characterized by the ability to form and maintain oil-in-water emulsions which are stable for extended periods of time under severe conditions of use and increase diamond life, with small, economical amounts of lubricant being consumed. Other advantages are that the lubricating compositions of this invention require less spindle power with less pressure to obtain the same glass surface finish.

8 Claims, No Drawings

PRODUCT

This application is a continuation-in-part of application Ser. No. 798,472, filed Aug. 16, 1968 now abandoned, which application is in turn a division of application Ser. No. 480,492, filed Aug. 17, 1965, issued July 8, 1969, as U. S. Pat. No. 3,453,784.

This invention relates to emulsifiable compositions which can be dispersed in water, the latter being the continuous phase, and to their use in the grinding of glass. The invention further concerns grinding glass with a diamond surface and using the emulsifiable compositions as a lubricant in the grinding operation.

It is well known to grind glass by the use of iron runner plates and sand together with water, followed by rough polishing. The rough glass sheets are often laid in plaster of paris and passed under the grinding plates. Various grit sizes of sand are used to obtain the desired smoothness before polishing. This requires considerable handling and grinding time and is therefore costly. Recently a new glass grinding process that utilizes industrial diamond grinding wheels has been developed; see for example U. S. Pat. Nos. 3,177,624 and 3,177,628, herein incorporated by reference. These grinding wheels have sufficient rigidity to give the desired smoothness to the glass. Moreover, the grinding wheels are designed so they can be used with current glass grinding equipment. In order to cool the grinding surfaces and to prevent excessive wear of the diamond grinding wheel, a coolant-lubricant is used in glass grinding operations.

Convention lubricants used in the glass industry have suffered from many deficiencies. In some instances, because the amount of lubricant required is so great, its cost exceeds that of industrial diamonds used in the grinding operation. Present commercial lubricants also suffer from emulsion instability and may therefore be adversely affected when they come in contact with grinding debris; plaster of paris, frequently used to hold the glass during the grinding process; increased acidity or alkalinity of the emulsion; colloidal glass particles; and heat producing during grinding. Under such conditions, the emulsion may break and cause the oil to separate, thus increasing diamond wear or consumption. This necessitates frequent replacement of the lubricant, thereby substantially increasing operating costs. Accordingly, there is a need for a new, improved and less costly lubricant composition for the diamond grinding of glass.

Desirable and essential features of the present invention are to produce emulsifiable compositions which, when dispersed in water as the continuous phase, are especially useful as lubricants in the diamond grinding of glass. Advantageously, the lubricants possess good stability in the presence of grinding debris, such as ground glass and plaster of paris, thus preserving the diamond containing grinding surface over long periods of operation, thereby making the grinding process more economical. The good stability of the lubricants may be due to the resistance to bacterial degradation exhibited by the emulsions while carrying only small amounts of glass particles produced during grinding.

These new compositions are also characterized by the ability to form and maintain oil-in-water emulsions which are stable for extended periods of time under severe conditions of use and thus increase diamond life, with small, economical amounts of lubricant being consumed. These new compositions have the salient advantage of evidencing their desirable properties under acid or alkaline conditions, in the presence of grinding debris, increased work load, etc.

The essential elements of the emulsifiable compositions of the present invention include, in addition to lubricating oil:

A. a non-ionic, surface-active long chain fatty acid partial ester of hexitol anhydrides;

B. a non-ionic, surface-active polyoxyethylene derivative of hexitol anhydride partial long chain fatty acid ester;

C. an alkylaryl polyether alcohol containing a short polyether chain; and

D. an alkylaryl polyether alcohol containing a long polyether chain.

One of the features of the present invention is the use of the emulsifiable composition, when dispersed in water as the continuous phase, as a lubricant in glass grinding operations. In other examples of the present invention, the composition may also advantageously contain either one or both of small amounts of lard oil and a light petroleum fraction. The presence or absence of the lard oil and light petroleum fraction may depend upon the desired properties of the lubricant as will be discussed hereinafter.

The emulsifiable compositions of the present invention contain the following approximate amounts of the emulsifiers:

TABLE I

| Emulsifier | Weight Percent | Preferred Weight Percent | Weight Ratio of Emulsifier |
|---|---|---|---|
| A. Long chain fatty acid partial ester of hexitol anhydride. | 2–8 | 3–8 | 1–4 |
| B. Polyoxyethylene derivative of hexitol anhydride partial long chain fatty acid ester. | 5–15 | 7–15 | 1–4 |
| C. Alkylaryl polyether alcohol (short polyether chain). | 2–8 | 3–8 | 1–4 |
| D. Alkylaryl polyether alcohol (longer polyether chain). | 5–15 | 7–15 | 1–4 |

Emulsifiers A, B, C and D, which are in the emulsifiable composition of the present invention are considered non-ionic, and are usually regulated to give a balanced stable emulsified system. The useful ratio of emulsifiers is shown in Table I, although the preferred ratio of components A, B, C and D is about 1:2:1:2, respectively, the emulsifiable composition when dispersed in water as the continuous phase can be used as a lubricant in glass grinding operations. The lubricating oil component of the emulsifiable compositions of this invention is preferably greater than about 50 weight percent, i.e. is the major portion of the compositions. When forming the emulsion in water, ambient or slightly elevated temperatures can be used, e.g., the temperature is usually below about 110°F., and the mixture agitated to ensure uniformity. The resulting soluble oil emulsion is regulated to give a stable oil-in-water emulsion, and the degree of stability desired may be dependent upon the particular use contemplated. The emulsifiable composition is often dispersed in water in a ratio of about 0.1–20 parts of emulsifiable composition for every 100 parts of water, preferably about 1–4 parts to every 100 parts of water. The presence of the lubricating oil in the composition produces greater freedom in the glass grinding operations thereby providing for increased flexibility.

The emulsifiable composition of this invention is often further blended with one or both of lard oil and a light petroleum fraction. The lard oil may be added to the composition to reduce bare cutting by the diamond grinding surface, thereby minimizing heat and wear and giving greater emulsion stability. The light petroleum fraction can be incorporated to help clean the grinding surface. The combination of lard oil and light petroleum fraction is designed to minimize the loading, thereby making it possible to put less weight on the grinding surface for a given cut. The addition of these components may make advisable for best performance the use of a greater emulsifier content to produce a stable emulsion under the adverse conditions encountered in grinding glass with diamond surfaces. If the composition contains one or both of lard oil and a light petroleum fraction, the lard oil may be present in an amount of about 0.5 – 15 weight percent, preferably about 3 – 10 weight percent, and the petroleum fraction in an amount of about 0.5 – 30 weight percent, preferably about 5 – 20. When both lard oil and the petroleum fraction are present, their ratios are often varied from about 0.5 to 5:1, preferably being about 1:2.

Component A of the emulsifiable compositions of the present invention is a fatty acid partial ester of hexitol anhydrides which employ long chain aliphatic acids containing from about 12 – 24 carbon atoms per molecule. The acids can be saturated or unsaturated and include, for example, lauric, palmitic, stearic and oleic acids. The alcohol component of the partial esters comprises "hexitol anhydride". By "hexitol anhydride" is meant inner ethers having at least one cyclic oxygen per ring derivable from a hexahydric alcohol by intermolecular condensation and includes the monoanhydro and dianhydro derivatives, i.e., hexides, hexitans, mannides, mannitans, and the like. By "partial ester" is meant that the hydroxy groups of the anhydride are not all esterified; mono-, di-, and tri-esters and mixtures thereof are preferred and these can be single or mixed esters. A commercially available emulsifier which is a long chain fatty acid partial ester of hexitol anhydride and which can be used in the exercise of the instant invention is Span 80 (Atpet 200). It is an oily liquid comprising essentially sorbitan monooleate, having a flush point of about 410°F., a fire point of about 545°F., and a specific gravity of about 1.00 to 1.05.

Component B of the emulsifiable composition of the present invention is a polyoxyalkylene derivative of the hexitol anhydride partial long chain fatty acid ester of component A. Such oxyalkylated reaction products preferably contain from about 2 to 25 or more moles of alkylene oxide per mole of the ester. An example of a commercially available material which can be used as emulsifier B in the instant invention is marketed as Tween 85, which is the reaction product of about 5 moles of ethylene oxide and 1 mole of sorbitan trioleate. It is an oily liquid at 25°C. having a flash point of about 565°F., a fire point of about 645°F., and a specific gravity of about 1.00 to 1.05.

Particularly satisfactory polyether alcohols which can be used in the emulsifiable compositions of the present invention are generally alkylaryl polyether alcohols containing short and long polyether chains. Suitable polyethers are alkylaryl polyether alcohols having the general formula $R-(O-CH_2-CH_2)_n-OH$ where R is an alkylaryl radical and $n$ is an integer from about 5 to 100 or more, preferably 5 to 25. The alkylaryl radical advantageously is essentially a lower alkyl benzene derivative such as the xylenes, durene and methylethyl benzene. Emulsifier C contains a short polyether chain wherein n can vary from about 5 – 10, and the emulsifier is readily miscible with formulin and the common organic solvents. Emulsifier D is similar to emulsifier C, differing primarily in the average length of the polyether chains. In emulsifier D, $n$ is greater than 10 and as high as about 25, often from about 11 – 20. Emulsifier D generally has at least 2 $n$'s more than emulsifier C in a given composition. The emulsifiable compositions thus include a mixture of the polyether alcohols, advantageously comprising about equal parts of long and short polyether chain types, for example, a mixture of homologous dimethyl benzene polyether alcohols where about half of the mixture has an average chain length of about 8 ether radicals (Triton X-45) and the remaining portion has an average chain length of about 15 ether radicals (Triton X-100).

The lubricating oils employed in the composition of the present invention are normally liquid and of lubricating viscosity. Suitable oils are mineral oils such as a neutral or other lubricating oil fraction, hydrogen refined mineral oils, or synthetic oils such as polyesters, polymerized olefins and the like. The hydrocarbon oils are generally preferred. The lubricating oil component can be highly refined if desired such as white oil, or be highly refined by distillation, hydrogenation, solvent extraction or clay or chemical treatment. The viscosity of the oil component is quite variable and may, for example, range from about 30 SUS at 100°F., to about 500 SUS at 210°F., the exact viscosity chosen depending upon the use contemplated. For the majority of applications, a mineral lubricating oil with a viscosity of about 60 to 400 SUS at 100°F. will be satisfactory. Examples of suitable lubricating oils of petroleum origin are a refined naphthenic or coastal oil of 100 SUS at 100°F. and mineral seal oil which is a light distillate oil of 40 – 45 SUS at 100°F.

The light petroleum fractions which may be added to the composition of the present invention are those which have boiling ranges above gasoline but below lubricating oils, for instance, boiling over a range greater than 100°F., a 50 percent boiling point greater than 425°F. and boiling primarily in the range of about 350° to 650°F. These hydrocarbon fractions were found to possess flammability characteristics suitable for glass grinding operations. An example of a petroleum fraction which meets the above requirements is kerosene.

The diamond grinding surface used in the process of the present invention comprises small particles of diamonds imbedded in a suitable matrix. The matrix is often termed "the bond". A metal matrix comprising for example a mixture of copper, zinc, soldering agents, iron, manganese, etc., may be employed as a suitable bond for the small particles of industrial diamonds. A typical grinding surface used in glass grinding operations is a diamond grinding wheel and is generally made with metal bonds. One typical bond which has proven satisfactory includes approximately 60 percent copper, 24 percent zinc, 11 percent silver-copper-solder, with the silver making up two-thirds to three-fourths of the solder, about 2 percent of iron and 1 percent of manganese. Other bonds including copper and tin and various combinations of elements mentioned above, are also satisfactory. Steel bonded wheels may also be employed. In general, it is contemplated that a wide variety of bonds may be employed.

Various arrangements of grinding surfaces have been used. For example, instead of processing only one side of the glass at a time, both sides may be treated simultaneously with grinding surfaces located above and below the plate glass. For such an arrangement the glass is generally supported opposite the active grinding wheels, and by bearing surfaces toward the center of the underlying grinding surfaces.

Normally, successive grinding stations spaced along a conveyor line are provided for progressively grinding the glass with surfaces employing finer and finer diamonds. At each of these stations, the grinding operation is accomplished by large grinding heads having vertically mounted spindles, which have horizontal grinding surfaces extending across the width of glass to be processed. Frequently about 4 or more grinding stations may be employed. The overall diamond size used in glass grinding operations can vary from about 1 to 1,000 microns. For example, the first stations may employ wheels containing diamond particles of about 275 microns (50–60 grit size) in diameter which can give a surface finish of about 150 microinches; intermediate stations may employ a diamond size of about 150 microns to give a surface finish of about 60 microinches and final stations may employ a diamond size of about 5 to 15 microns to give a surface finish of about 7 microinches or less.

The diamond concentrations generally used in glass grinding operations can vary from about 0.05 to 20 carats/in.$^3$ of matrix with a concentration of about 0.1 to 9 carats/in.$^3$ frequently being used. Suitable diamond grinding wheels and their use in grinding glass are described in U. S. Pat. Nos. 3,177,624 and 3,177,628.

The ease and efficiency of grinding is dependent upon many factors such as the concentration of diamonds in the wheel, the size of the diamonds, etc. However, regardless of these factors it has been found necessary under most conditions to use a fluid on the glass being ground which acts both as a coolant and lubricant. Grinding wheel life can be increased and power requirements decreased by using the proper lubricant. Grinding wheel life can be measured in cubic inches of glass removed per carat of diamond lost in the operation and for a given grit size a proper lubricant improves wheel life. Lubricants also tend to decrease grinding power requirements measured as spindle power.

The non-ionic emulsifier-containing emulsion of this invention is most effective when the concentration of emulsifier is adjusted according to the size of diamond particles in the wheel. As the diamond size increases, the amount of emulsifier may also be increased. As an alternative to increasing the emulsifier content, the concentration of the dispersed phase in the water coolant can be increased, but increasing this concentration beyond a point, e.g., about 10 percent, is usually economically unattractive.

The following examples illustrate four typical lubricant compositions of the present invention and their use as a coolant-lubricant for grinding plate glass with diamond grinding wheels.

| Ingredients | Weight Percent | | | |
|---|---|---|---|---|
| | (1) | (2) | (3) | (4) |
| Base Oil | | | | |
| a. 100 SUS at 100°F. | | | | |
| Mineral Oil | 83.50 | 53.50 | 61 | 65.80 |
| b. Mineral Seal Oil | — | 30.00 | — | 10.00 |
| Tween 85 | 5.50 | 5.50 | 8 | 6.4 |
| Atpet 200 | 2.75 | 2.75 | 4 | 3.2 |
| Triton X-45 | 2.75 | 2.75 | 4 | 3.2 |
| Triton X-100 | 5.50 | 5.50 | 8 | 6.4 |
| No. 2 Lard Oil | — | — | 5 | 5.0 |
| Kerosene | — | — | 10 | — |
| Test Results | | | | |
| Gravity °API | 19.70 | 24.50 | 20.4 | 21.0 |
| Flash, °F. | 325 | 315 | 250 | 325 |
| Viscosity, SUS at 100°F. | 157.20 | 87.6 | 121.0 | 129.2 |
| Pour °F. | 0 | 5 | 0 | −5 |
| Color ASTM | L1.0 | L1.0 | L1.5 | L1.5 |
| Acid Number | 0.31 | 0.45 | 4.20 | 2.39 |
| Saponification Number | 8.65 | 8.43 | 22.9 | 19.6 |
| Emulsion stability after 24 hrs. (5% Oil in Distilled Water) | No Cuff | No Cuff | No Cuff | No Cuff |

The compositions 1, 2, 3, and 4 were evaluated as lubricants for diamond wheels in glass grinding operations under the following conditions:

Wheel — 270–325 mesh — 2 carat/cubic inch.
Downfeed — 0.0005 inch per table reversal.
Wheel Speed — 2450 r.p.m.
Table Speed — 200 inches/min.
Glass Size — 3½ inches × 18 inches Soda-Lime.
Coolant Concentration — 1 pt. oil to 25 pts. water (4 percent coolant).

The diamond life was evaluated in terms of cubic inches of glass removed per carat of diamond lost. The results are given below.

| Lubricant Type | Total Glass Removed (cu. inch) | Wheel Wear (inch) | Anticipated Diamond Life Cu. inch of Glass Removed Per Carat |
|---|---|---|---|
| Composition (1) | 380.8 | 0.0069 | 1,899 |
| Composition (2) | 386.6 | 0.0054 | 2,424 |
| Composition (3) | 380.5 | 0.0063 | 2,035 |
| Composition (4) | 284.4 | 0.0067 | 1,934 |

| Lubricant Type | Average Surface Finish (Microinches) | Average Depth of Fracture (Microinches) | Average Spindle Power (Watts) |
|---|---|---|---|
| Composition (1) | 31.4 | — | 624 |
| Composition (2) | 24.3 | — | 800 |
| Composition (3) | 28.1 | 1941 | 620 |
| Composition (4) | 27.3 | 1802 | 648 |

In terms of anticipated diamond life lubricating compositions 2 and 3 show superiority relative to compositions 1 and 4. In terms of freedom of cut (spindle power required), compositions 1, 3 and 4 are improved over composition 2 which is less free-cutting than the other lubricants.

The lubricant disclosed in U. S. Pat. No. 2,968,621 to Teeter et al., which unlike the composition of the present invention contains an amine reaction product, when compared with that of the present invention as a lubricant in glass grinding operations was found to suffer from many deficiencies. Although the lubricating composition of the patent gave satisfactory performances in conventional glass grinding operations for short periods of time, to avoid lubricant breakdown a 6 percent emulsion had to be used instead of a 1 percent emulsion which can be used in the instant process. As the rate of production in the glass grinding process was doubled, emulsion stability problems were encountered with the composition of the patent. The emulsions broke after 3 to 4 days instead of giving 6 to 8 weeks of service as obtained at the lower rate of production. Grinding debris, plaster of paris, increased alkalinity of the emulsions and the additional heat produced by the increased production appeared to be deleterious to the stability of the emulsions of the patent.

In further testing emulsion stability, lard oil and kerosene were added to a typical soluble oil composition of the Teeter et al patent and tested for emulsion stability in the presence of plaster and silica. In the best results obtained, the plaster had little detrimental effect on the emulsion stability for the 7-day period tested, however, silica broke the emulsion in 1 day. In a similar test using the lubricant compositions of the present invention, the best results indicated no emulsion instability of the 7-day period tested.

In using the lubricant of the Teeter et al. patent, it was consistently observed that the bonded oil content was never 100 percent of the total oil content. Thus, there was always present a percentage of so-called free oil. However, the emulsion stability in the composition of the present invention appears to be outstanding. Continual checks throughout operations using the lubricant of the present invention have revealed consistently that the bonded oil content was substantially 100 percent of the total oil content of the lubricant solution.

To demonstrate the improvements in the lubricating compositions of the present invention over that of the Teeter et al. patent, the patentees' composition containing the amine reaction product was compared with composition 3 of the present invention containing both lard oil and kerosene. In the first evaluation the two compositions were used as lubricants in a glass grinding process in which a laboratory-size diamond wheel of 3 inch diameter and intermediate diamond grit size was used as the grinding surface. Composition 3 of the present invention was used at a concentration of 1 part oil to 25 parts water. The following results were obtained:

| Lubricant | Diamond Life Cu Inches of Glass Removed per Carat | Net Spindle Power (Watts) | Average Surface Finish (Microinch) |
| --- | --- | --- | --- |
| Teeter et al. | 2442 | 586 | 41.3 |
| Composition (3) | 2905 | 519 | 41.7 |

On the basis of the above comparison, composition 3 showed improved diamond life with decreased spindle power requirement and equivalent surface finish.

A further comparison was made using a 10 inch diameter wheel of intermediate grit size and reducing the emulsion concentration of composition 3 to 1 part oil for every 50 parts water. The following results were obtained:

| Lubricant | Diamond Life Cu Inches of Glass Removed per Carat | Net Spindle Power (Watts) | Average Surface Finish (Microinch) |
| --- | --- | --- | --- |
| Teeter et al. Patent | 2756 | 850 | 44.6 |
| Composition (3) | 3014 | 565 | 38.0 |

Composition 3 showed improved diamond life over the Teeter et al. patent composition with decreased spindle power requirement and improved surface finish.

To demonstrate how the lubricating compositions of the present invention enhance the freedom of cut of diamond grinding wheels, a 5 percent solution of the Teeter et al. patent lubricant was compared with a 4 percent solution of composition 3 of the present invention, with the following results:

| | 5% Teeter et al Patent Composition | | 4% Composition 3 | |
| --- | --- | --- | --- | --- |
| Diamond Grinding Surface | Pressure Required (lbs.) | Spindle Power Required (amps) | Pressure Required (lbs.) | Spindle Power Required (amps) |
| Head B | 3500-5520 | 40/110 | 2764-3000 | 85/95 |
| Head C | 1700-2600 | 75/80 | 1150-1270 | 70/75 |
| Head D | 3500-3900 | 70/90 | 1150-1510 | 50/55 |

On the basis of the above comparison, the lubricating composition of the present invention requires less pressure at a reduced spindle power thus enhancing the freedom of cut. This improved efficiency can permit a reduction in the lubricant oil content to a level of about 1.5 to 3 percent which contributes greatly to improved lubricant economics and operating efficiency of diamond grinding surfaces.

From the above tests and comparisons, it is our observations that although the prior art lubricating compositions gave adequate lubrication with some emulsion instability for a period of 6 to 8 weeks, after this period serious emulsion stability problems were encountered. However, the lubricating compositions of the present invention were still being used after 9 months of service with little or no instability problems even in an operation in which the composition is continuously recycled across the cutting surface. The composition of the invention has also been successful in diamond grinding in a four foot continuous glass line making plate glass for automobiles.

It is claimed:

1. An emulsifiable composition for diamond grinding of glass consisting essentially of oil of lubricating viscosity, 2 – 8 weight percent of a long chain fatty acid partial ester of hexitol anhydride wherein the fatty acid portion of said partial ester contains 12 to 24 carbon atoms; 5 – 15 weight percent of a polyoxyethylene derivative of hexitol anhydride partial long chain fatty acid ester containing about 2 to 25 mols of ethylene oxide per mole of ester; 2 – 8 weight percent of a first alkylaryl polyether alcohol containing a polyether chain of about 5 – 10 ether groups; and 5 – 15 weight percent of a second alkylaryl polyether alcohol containing a polyether chain of about 11 – 20 ether groups, and at least two ether groups greater than said first polyether, the ratio of A:B:C:D being about 1 to 4:1 to 4:1 to 4:1 to 4, respectively.

2. The composition of claim 1 wherein the lubricating oil is a hydrocarbon oil having a viscosity in the range of about 30 SUS at 100°F., to about 500 SUS at 210°F.

3. The composition of claim 1 which further contains a material selected from the group consisting of about 0.5 – 15 weight percent lard oil, about 0.5 – 30 weight percent of a light petroleum fraction, boiling above the gasoline range and below the lubricating oil range, and mixtures thereof.

4. The composition of claim 1 wherein the long chain fatty acid partial ester of hexitol anhydride is sorbitan mono-oleate, the polyoxyethylene derivative of hexitol anhydride partial long chain fatty acid ester is ethoxylated sorbitan trioleate, and the first and second alkylaryl polyether alcohols are ethyoxylated dimethyl benzene.

5. An emulsifiable composition for diamond grinding of glass consisting essentially of (A) 2 – 8 weight percent of a long chain fatty acid partial ester of hexitol anhydride wherein the fatty acid portion of said partial ester contains 12 to 24 carbon atoms; (B) 5 – 15 weight percent of a polyoxyethylene derivative of hexitol anhydride partial long chain fatty acid ester containing about 2 to 25 moles of ethylene oxide per mole of ester; (C) 2 – 8 weight percent of a first alkylaryl polyether alcohol containing a polyether chain of about 5 – 10 ether groups; (D) 5 – 15 weight percent of a second alkylaryl polyether alcohol containing a polyether chain of about 11 – 20 ether groups, and at least two ether groups greater than said first polyether, the ratio of A:B:C:D being about 1:2:1:2, respectively, (E) greater than 50 weight percent of a normally liquid hydrocarbon oil having a viscosity in the range of about 30 SUS at 100° F. to about 500 SUS at 210°F., and (F) a material selected from the group consisting of about 3 – 10 weight percent lard oil, about 5 – 20 weight percent of a light petroleum fraction, boiling above the gasoline range and below the lubricating oil range, and mixtures thereof.

6. The composition of claim 5 wherein the hydrocarbon oil has a viscosity in the range of about 60 to 400 SUS at 100°F.

7. The composition of claim 5 wherein the light petroleum fraction boils primarily within the range of about 350° to 650°F.

8. An emulsifiable composition for diamond grinding of glass consisting essentially of normally liquid hydrocarbon oil of lubricating viscosity, about 4 weight percent of sorbitan monooleate, about 8 weight percent of ethoxylated sorbitan trioleate, about 4 weight percent of an alkylaryl polyether alcohol of the formula:

$R - (O - CH_2 - CH_2)_n - OH$ where R is xylyl and $n$ is about 8, about 8 weight percent of an alkylaryl polyether alcohol of the formula:

$R - (O - CH_2 - CH_2)_n - OH$ where R is xylyl and $n$ is about 15, about 5 weight percent lard oil, and about 10 weight percent kerosene.

* * * * *